(12) United States Patent
Endo

(10) Patent No.: US 8,137,449 B2
(45) Date of Patent: Mar. 20, 2012

(54) INKJET INK

(75) Inventor: Toshihiro Endo, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 703 days.

(21) Appl. No.: 12/078,380

(22) Filed: Mar. 31, 2008

(65) Prior Publication Data
US 2009/0198003 A1    Aug. 6, 2009

(30) Foreign Application Priority Data

Mar. 30, 2007 (JP) ................................. 2007-91011

(51) Int. Cl.
*C09D 11/02* (2006.01)
(52) U.S. Cl. .................................................. 106/31.75
(58) Field of Classification Search ................ 106/31.75
See application file for complete search history.

(56) References Cited

U.S. PATENT DOCUMENTS 7,022,172 B2 *  4/2006  Ohkawa et al. ............ 106/31.86
7,060,125 B2     6/2006  Ohkawa et al.
2003/0192453 A1  10/2003  Ohkawa et al.
2007/0022904 A1 *  2/2007  Kitawaki et al. ........... 106/31.86

FOREIGN PATENT DOCUMENTS

| CN | 1451699 A | 10/2003 |
| JP | 2003-261808 | 9/2003 |
| JP | 2005-350563 | 12/2005 |

OTHER PUBLICATIONS

Official Action issued on Mar. 11, 2010 in Chinese Application No. 200810089109.1.

* cited by examiner

*Primary Examiner* — Jerry Lorengo
*Assistant Examiner* — Veronica F Faison
(74) *Attorney, Agent, or Firm* — Fitch, Even, Tabin & Flannery LLP

(57) ABSTRACT

An inkjet ink is provided, which is hardly wettable to the surface of nozzle plates, and thus is stably ejected and is prevented from staining images. The inkjet ink is an oil-based inkjet ink which contains at least a pigment, a pigment-dispersing agent and a solvent constituted by at least an ester solvent, a salt of a long-chain polyaminoamide and a polar acidic ester in an amount of 1% by weight or more relative to the total amount of the ink.

9 Claims, 1 Drawing Sheet

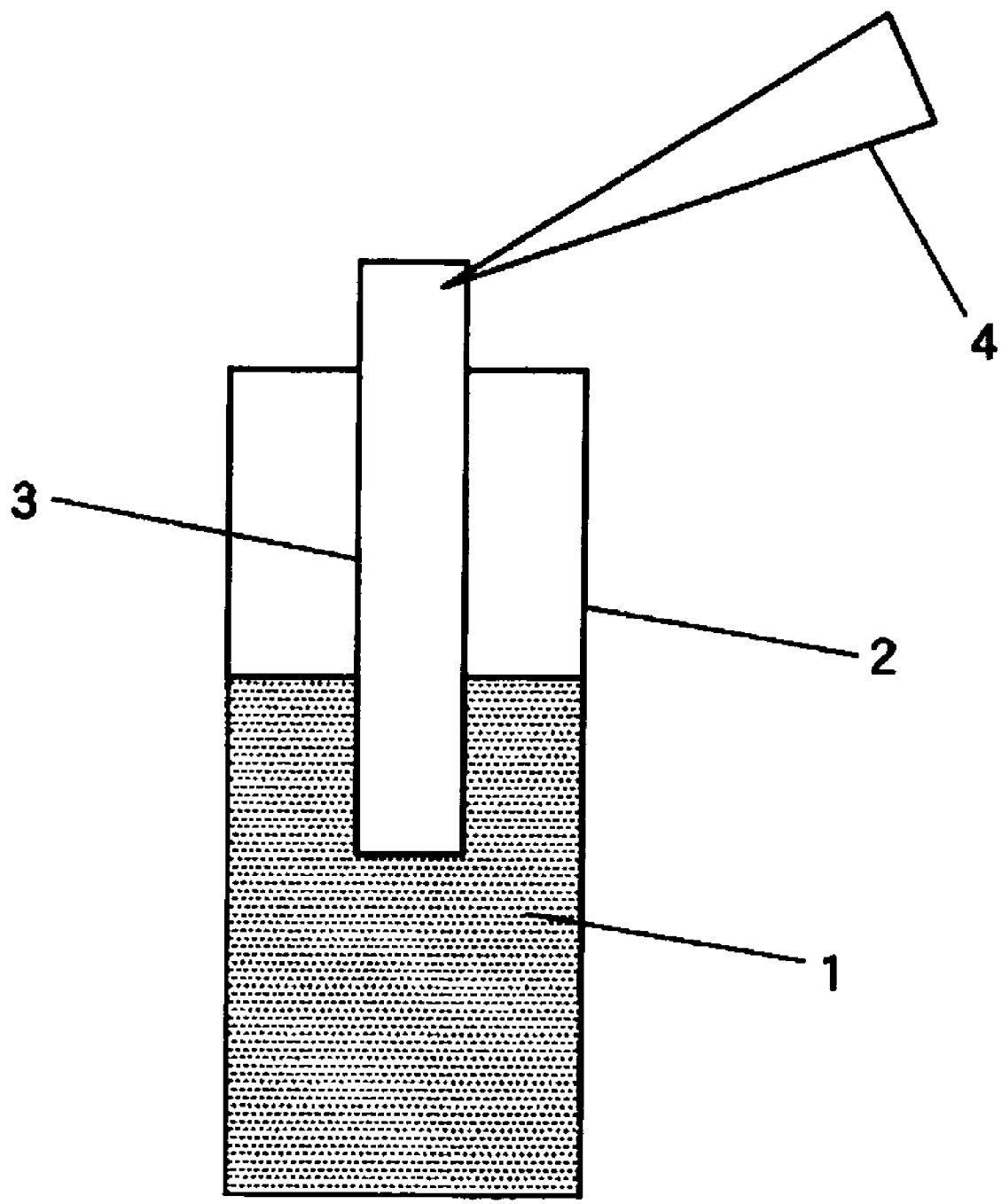

ID
INKJET INK

CROSS-REFERENCE TO RELATED APPLICATION

This application claims the benefit of foreign priority under 35 U.S.C. §119 based on JP 2007-91011, filed Mar. 30, 2007, the entire disclosure of which application is hereby incorporated by reference herein.

TECHNICAL FIELD

The present invention relates to an oil-based ink suitable for use in an inkjet recording system, more specifically relates to an inkjet ink superior in repellency against nozzle plates.

BACKGROUND ART

Japanese Patent Laid-Open No. 2003-261808 discloses an oil-based inkjet ink which contains a solvent comprising 60% by weight or more of a polar organic solvent, and the polar organic solvent comprises 10% by weight or more of an ester solvent, whereby the ink is improved in storage stability.

In addition, Japanese Patent Laid-Open No. 2005-350563 discloses an ink which contains a solvent comprising predetermined amounts of an unsaturated fatty acid ester solvent and a hydrocarbon solvent, whereby the ink hardly causes clogging in an ink nozzle of an inkjet head even after the ink has been left for a long time in a state of being filled in the ink nozzle until it is used for jet printing.

However, the ink containing such an ester solvent is problematic in that the ink is too wettable to the nozzle plate of the inkjet ink head, and thus the ink attracted to the nozzle plate falls dropwise onto paper to stain printed images, or the ink attracted to the plate hinders ejection of droplets of the ink.

It is conceivable to add an additive to the ink in order to change the ink in wettability to the nozzle plate. However, in general, when the wettability of the ink is lowered, there is a risk that the ink becomes lowered in dispersion stability of pigments, in other words, storage stability. Thus, both have been considered to trade-off each other.

[Patent Document 1] Japanese Patent Laid-Open No. 2003-261808.
[Patent Document 2] Japanese Patent Laid-Open No. 2005-350563.

DISCLOSURE OF INVENTION

An object of the present invention is to provide an inkjet ink which is lowered in wettability to the surface of nozzle plates so that it is stably ejected and prevented from staining images.

As a result of extensive investigations made for achieving the above described object, the present inventors have found that it is possible to improve an oil-based inkjet ink in repellency against the surface of nozzle plates without impairing storage stability of the ink by adding a specific compound to an oil-based inkjet ink that comprises at least a pigment, a pigment-dispersing agent and an ester solvent, and thus have accomplished the present invention.

According to the present invention, an oil-based inkjet ink is provided, which comprises at least a pigment, a pigment-dispersing agent and a solvent, in which said solvent comprises an ester solvent, said inkjet ink further comprising a salt of a long-chain polyaminoamide and a polar acidic ester in an amount of 1% by weight or more and preferably 2 to 20% by weight relative to the total amount of the ink.

According to a preferred embodiment of the present invention, a polyamide-based dispersing agent that has a pectinated structure constituted by a plurality of side chains composed of polyesters is used as the pigment-dispersing agent.

According to another preferred embodiment of the present invention, the solvent comprises 30 to 70% by weight of a non-polar solvent and 70 to 30% by weight a polar solvent, in which an ester solvent having an α-value of 6° to 8° constitutes 20% by weight or more of the total amount of the solvent.

According to the present invention, an oil-based inkjet ink that comprises at least a pigment, a pigment-dispersing agent and an ester solvent is supplemented with a salt of a long-chain polyaminoamide and a polar acid ester in a predetermined amount relative to the total amount of the ink. As a result, the ink is improved in repellency against the surface of nozzle plates without impairing storage stability of the ink, and thus can be stably ejected and prevented from staining images.

BEST MODE FOR CARRYING OUT THE INVENTION

Hereinafter, the present invention will be described in further detail.

The inkjet ink according to the present invention contains at least a pigment, a pigment-dispersing agent, a solvent and a salt of a long-chain polyaminoamide and a polar acidic ester, and may include other additives such as a resin, as needed.

The solvent to be used in the present invention includes at least an ester solvent, and in addition to this, may include a polar solvent other than the ester solvent and/or a non-polar solvent.

The ester solvent includes, for instance, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl isostearate, 2-octyldodecyl pivalate, methyl soyate, isobutyl soyate, methyl tallol, isobutyl tallol, diisopropyl adipate, diisopropyl sebacate, diethyl sebacate, propylene glycol monocaprate, trimethylol-propane tri-2-ethyl hexanoate, and glyceryl tri-2-ethylhexanoate. These ester solvents can be used singly or in combination of two or more.

The polar organic solvent other than the ester solvent includes an alcohol solvent, a higher fatty acid solvent and an ether solvent. These polar organic solvents can be used singly or in combination with two or more. When two or more of the polar organic solvents are mixed and/or a polar organic solvent is mixed with a solvent other than the polar organic solvents, they are selected so as to form a single phase.

Specifically, the alcohol solvent includes a higher alcohol such as isomyristyl alcohol, isopalmityl alcohol, isostearyl alcohol and oleyl alcohol.

The higher fatty acid solvent includes, for example, isononanoic acid, isomyristic acid, hexadecanoic acid, isopalmitic acid, oleic acid, and isostearic acid.

The ether solvent includes, for example, diethylene glycol monobutyl ether, ethylene glycol monobutyl ether, propylene glycol monobutyl ether, and propylene glycol dibutyl ether.

A solvent to be used in the present invention preferably comprises 30 to 70% by weight of a non-polar solvent and 70 to 30% by weight of a polar solvent. In addition, it is preferred that an ester solvent, particularly an ester solvent having an α-value of 6° to 8° constitutes 20% by weight or more of the total amount of the solvent. Here, the ester solvent belongs to the polar solvent. Accordingly, the ester solvent having an α-value of 6° to 8° may constitute 20 to 70% by weight of the entire solvent. When the ester solvent having an α-value of 6° to 8° constitutes 70% by weight of the entire solvent, the polar solvent is composed only of the ester solvent having an α-value of 6° to 8°. When the ester solvent having an α-value of 6° to 8° constitutes 30% by weight or more but less than 70% by weight of the entire solvent, the polar solvent may be composed only of the ester solvent having an α-value of 6° to 8°, or another polar solvent may be used in combination. When the ester solvent having an α-value of 6° to 8° constitutes 20% by weight or more but less than 30% by weight of the entire solvent, another polar solvent is used in combination with the ester solvent having an α-value of 6° to 8° so that the total of the polar solvents constitutes 30 to 70% by weight of the entire solvent. When the ester solvent having an α-value of 6° to 8° and another polar solvent are used in combination, the latter solvent is preferably a polar solvent other than the ester solvents, and is particularly preferably an alcohol solvent, in order to reduce toner solubility.

The ester solvent having an α-value of 6° to 8° includes higher fatty acid esters such as isooctyl palmitate (α-value 7.28°), hexyl palmitate (α-value 7.77°), isooctyl isopalmitate (α-value 7.43°), butyl stearate (α-value 7.77°), hexyl stearate (α-value 7.13°), isooctyl stearate (α-value 6.71°), hexyl oleate (α-value 7.36°) and 2-octyldodecyl pivalate (α-value 7.28°). In this specification, "higher" means having 9 or more, preferably 12 or more carbon atoms in a molecule. Preferred higher fatty acid esters constituting the ester solvent having an α-value of 6° to 8° includes compounds containing 22 or more but 32 or less carbon atoms in a molecule. Preferably, the ester solvent has an α-value of 7° to 8°, and is more preferably composed of at least one selected from the group consisting of isooctyl palmitate, isooctyl isopalmitate and 2-octyldodecyl pivalate.

The α-value means the value of α determined by $\tan\alpha = ($inorganic value/organic value$)$. Herein, the "organic value" and the "inorganic value" are based on the notion used in the "organic conception diagram" proposed by Atsushi Fujita, in which nature of organic compounds is categorized by two factors of "organic nature" derived from the chain of covalent bonds of carbon chains and "inorganic nature" derived from the influence of electrostatic properties in substituents (functional groups), and each factor is determined from the structure of compounds and converted to numerical values. The value α indicates the quantitative balance between the "organic nature" and the "inorganic nature" of a compound. Details of the "organic conception diagram" are described in "Systematic Qualitative Organic Analysis (Mixtures)", Atsushi Fujita et al., Kazama Shobo Co., Ltd. (1974).

Since the ester solvent having an α-value of 6° to 8° has appropriate polarity, it is considered that use of the ester solvent in inkjet ink prevents increase in viscosity of the solvent with time and solidification in low temperature environment, thereby maintaining on-machine stability, and at the same time, prevents dissolution of toner resins.

Examples of ester solvents other than the ester solvents having an α-value of 6° to 8° include methyl laurate (α-value 12.99°), isopropyl laurate (α-value 11.69°), isopropyl myristate (α-value 10.30°), isopropyl palmitate (α-value 9.21°), isostearyl palmitate (α-value 5.12°), methyl oleate (α-value 9.27°), ethyl oleate (α-value 8.81°), isopropyl oleate (α-value 8.60°), butyl oleate (α-value 8.02°), methyl linoleate (α-value 9.41°), isobutyl linoleate (α-value 8.15°), ethyl linoleate (α-value 8.95°), and isopropyl isostearate (α-value 8.53°).

The non-polar solvent includes petroleum hydrocarbon solvents such as naphthenic, paraffinic and isoparaffinic solvents. Specific examples thereof include "Isopar" and "Exxol" (both trade names) available from Exxon Mobil Corporation, "AF Solvent" (trade name) available from Nippon Oil Corporation, and "Sunthene" and "Sunpar" (both trade names) available from Sunoco Inc.

The pigment to be used in the present invention is not particularly limited and one generally used in the field of printing can be used regardless of whether it is an organic pigment or an inorganic pigment. Specifically, carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxazine pigments, threne pigments, perylene pigments, thioindigo pigments, quinophthalone pigments and metal complex pigments can be preferably used. These pigments may be used alone or in combination.

Preferably, the pigment is contained in the ink in a proportion of 0.01 to 20% by weight relative to the total amount of the ink.

A pigment-dispersing agent to be used in the present invention is not particularly limited as long as it disperses the pigment in the solvent in a stable state. Accordingly, conventionally known pigment-dispersing agents can be used. Among them, a polyamide-based dispersing agent that has a pectinated structure constituted by a plurality of side chains composed of polyesters is preferably used. The polyamide-based dispersing agent that has a pectinated structure constituted by a plurality of side chains composed of polyester is a compound which has a main chain containing many nitrogen atoms such as polyethyleneimine and has a plurality of side chains that are bonded to the nitrogen atoms through amide-linkage in which the side chains are polyesters. Examples thereof include dispersing agents with a structure that has a main chain formed of polyalkyleneimine such as polyethyleneimine to which poly(carbonyl-$C_{3-6}$-alkyleneoxy) chains are bonded as side chains through amide-linkage in which the poly(carbonyl-$C_{3-6}$-alkyleneoxy) chains each contain 3 to 80 carbonyl-$C_{3-6}$-alkyleneoxy groups, as is disclosed in Japanese Patent Laid-Open No. 5-177123 and the corresponding U.S. Pat. No. 4,645,611 the disclosure of which is incorporated herein by reference. Such polyamide-based dispersing agents with the pectinated structure are commercially available as Solsperse 11200 and Solsperse 28000 (both trade names) made by Lubrizol Japan Ltd.

The content of the above described dispersing agent only has to be an amount capable of sufficiently dispersing the above described pigment in an ink, and can be appropriately set.

The salt of a long-chain polyaminoamide and a polar acidic ester to be used in the present invention is known as a pigment-dispersing agent as well, but it has been found in the present invention that the addition of the salt to an oil-based inkjet ink containing an ester solvent improves the ink in repellency against nozzle plates. In the salt, the long-chain polyaminoamide includes, for example, polyethyleneimine chains with an average molecular weight of preferably 250 to 200,000, more preferably 1,000 to 40,000, and the polar acidic ester includes, for example, sulfuric acid esters and phosphoric acid esters, preferably phosphoric acid esters, more preferably, mono- or di-esters of phosphoric acid with mono-alcohols such as oxyalkylated mono-alcohols including polyalkyleneglycols that are methoxylated, ethoxylated, propoxylated or butoxylated, as disclosed in U.S. Pat. No. 6,111,054 the disclosure of which is incorporated herein by reference. The salt of a long-chain polyaminoamide and a polar acidic ester is commercially available, for instance, as Disperbyk-101 (trade name) made by BYK Japan KK. The salt of a long-chain polyaminoamide and a polar acidic ester is preferably used in combination with the above described polyamide-based dispersing agent with the pectinated structure, so that the ink is provided with excellent repellency against nozzle plates without deteriorating storage stability.

In order to provide the ink with repellency against nozzle plates, the salt of a long-chain polyaminoamide and a polar acidic ester should be added in an amount of 1% by weight or more relative to the total amount of the ink, preferably 2 to 20% by weight relative to the total amount of the ink.

The inkjet ink according to the present invention can contain, for instance, a dye, a surface active agent and a preservative in addition to the above described solvent, pigment-dispersing agent and pigment, as long as they do not affect the ink in terms of repellency against nozzle plates, storage stability and oxidation stability.

The inkjet ink according to the present invention can be prepared by introducing the components into a known dispersing machine such as a bead mill at once or in installments and dispersing them, and if desired, passing them through a known filtering device such as a membrane filter. Specifically, the ink can be prepared by preparing in advance a mixture in which part of the solvent and all of the pigment and the dispersing agent are homogeneously mixed and dispersing the mixture in a dispersing machine, and then adding the rest of the components to the resulting dispersion and passing the mixture through a filtering device.

The viscosity at 23° C. of the inkjet ink of the present invention thus produced is adjusted to preferably 5 to 30 mPa·s, more preferably 7 to 14 mPa·s, which are suitable for ejecting the ink from an inkjet head nozzle. Preferably, the solidifying point of the ink is adjusted to −5° C. or lower so that the ink does not freeze under storage conditions.

EXAMPLES

Hereinafter, the present invention will be described in more detail by way of examples, but the present invention is not limited to these examples.

Examples 1 to 6 and Comparative Examples 1 to 5

An inkjet ink was prepared by premixing the components shown in Table 1 at a ratio shown in Table 1; charging 30 g of the resulting mixture into a glass vessel together with 80 g of zirconia beads (Φ0.5 mm); shaking the glass vessel using a rocking mill (RM05S made by Seiwa Giken Co., Ltd.) at a frequency of 60 Hz for two hours. The mixing amount of each component is expressed as % by weight in Table 1.

The inkjet inks obtained in the above described Examples and Comparative Examples were subjected to evaluation of ink storage stability and wettability to a nozzle plate according to methods described below. The evaluation results are shown in Table 1.

(1) Storage Stability of Ink

Initial viscosity was measured immediately after each of the above described inks was prepared. Then, each of the inks was left in an environment at 70° C. for one month, and the viscosity of each of the left inks was measured. The viscosity was measured using a Rheometer RS75 made by Haake Technik GmbH. Based on these measurement results, a rate (%) of viscosity change was determined according to the expression shown below.

$$\text{rate}(\%) \text{ of viscosity change} = \frac{\text{viscosity of left ink} - \text{initial viscosity}}{\text{initial viscosity}} \times 100$$

(2) Evaluation of Wettability to Nozzle Plate

As shown in FIG. 1, an inkjet ink 1 was charged in a 30 ml container 2, and a 2 cm-long end portion of a nozzle plate 3 (5 cm long and 5 mm wide) used for an inkjet printer HC5500 (a trade name) made by Riso Kagaku Corporation was immersed in the ink by picking up the other end portion of the nozzle plate with a pair of tweezers 4. Subsequently, the nozzle plate was quickly raised to measure a period of time until an ink film remaining on the nozzle plate forms a droplet of the ink. The measurement was repeated ten times, and the average value was calculated to obtain an ink-repellent period of time. Wettability was evaluated according to the following criteria. The nozzle plate used for the above measurement was made of a polyimide film that was surface-treated with a fluororesin.

TABLE 1

| | | | Example | | | | | | Comparative Example | | | | |
|---|---|---|---|---|---|---|---|---|---|---|---|---|---|
| | | | 1 | 2 | 3 | 4 | 5 | 6 | 1 | 2 | 3 | 4 | 5 |
| Pigment | Carbon black | MA8 | 5.0 | 5.0 | 5.0 | 5.0 | | | | | | | |
| | Carmine 6B | 6B-320 | | | | | 5.0 | 5.0 | 5.0 | 5.0 | 5.0 | 5.0 | 5.0 |
| Dispersing agent | Polyamide-based dispersing agent having polyester chain | Solsperse 28000 | | | | | | 2.0 | | | | | |
| | | Solsperse 11200 | 3.0 | 3.0 | 3.0 | 3.0 | 2.0 | | 2.0 | 2.0 | | 3.0 | 3.0 |
| Solvent | Ester solvent | Isooctyl palmitate | 41.0 | 32.0 | 22.0 | 12.0 | 41.0 | 38.0 | 43.0 | 42.5 | 40.0 | 37.0 | 37.0 |
| | Alcohol solvent | Isomyristyl alcohol | 20.0 | 20.0 | 20.0 | 20.0 | 20.0 | 20.0 | 20.0 | 20.0 | 20.0 | 20.0 | 20.0 |
| | Petroleum hydrocarbon | Isobar L | 30.0 | 30.0 | 30.0 | 30.0 | 30.0 | 30.0 | 30.0 | 30.0 | 30.0 | 30.0 | 30.0 |
| | Salt of long-chain polyaminoamide and polar acidic ester | Disperbyk-101 | 1.0 | 10.0 | 20.0 | 30.0 | 2.0 | 5.0 | | 0.5 | 5.0 | | |
| | Polycarboxylate of | Anti-Terra-205 | | | | | | | | | | | 5.0 |

TABLE 1-continued

|  | Example |  |  |  |  |  | Comparative Example |  |  |  |  |
|---|---|---|---|---|---|---|---|---|---|---|---|
|  | 1 | 2 | 3 | 4 | 5 | 6 | 1 | 2 | 3 | 4 | 5 |
| polyaminoamide |  |  |  |  |  |  |  |  |  |  |  |
| Salt of long-chain polyaminoamide and acidic polymer Anti-Terra-U100 |  |  |  |  |  |  |  |  |  |  | 5.0 |
| Total (% by weight) | 100.0 | 100.0 | 100.0 | 100.0 | 100.0 | 100.0 | 100.0 | 100.0 | 100.0 | 100.0 | 100.0 |
| Dispersion stability | ○ | ○ | ○ | ○ | ○ | ○ | ○ | ○ | X | X | ○ |
| Rate of viscosity change % (at 70° C. for one month) | −1.3 | 0.4 | −0.7 | −1.1 | 0.2 | 1.0 | 0.5 | −0.9 | 142 | 33 | 7.8 |
| Wettability to nozzle plate | Δ | ○ | ○ | ○ | ○ | ○ | X | X | Not determined | Not determined | X |
| Ink repellent period of time against nozzle plate (sec) | 3.9 | 2.0 | 1.8 | 1.8 | 3.4 | 2.8 | 4.3 | 4.3 |  |  | 5.2 |

Evaluation criteria:
Ink repellent period of time (sec); Less than 3.5 sec → ○, 3.5 to 4.0 sec → Δ, 4.0 sec or more → X.
X: ink-repellent period of time of 4 seconds or more
Δ: ink-repellent period of time of 3.5 seconds or more but less than 4 seconds
○: less than 3.5 seconds Reference characters for raw materials shown in Table 1 mean as follows:

MA8 (trade name): a carbon black made by Mitsubishi Chemical Corporation.
6B-320 (trade name): Carmine 6B made by Dainippon Ink Corporation.
Solsperse 28000: a pigment-dispersing agent, Solsperse 28000 (trade name) made by Lubrizol Ltd.
Solsperse 11200: a pigment-dispersing agent, Solsperse 11200 (trade name) made by Lubrizol Ltd.
Isobar L (trade name): a petroleum hydrocarbon solvent made by Nippon Oil Corporation.
Disperbyk-101: a salt of a long-chain polyaminoamide and a polar acidic ester, made by BYK Japan KK.
Anti-Terra-205: a polycarboxylate of polyaminoamide made by BYK Japan KK.
Anti-Terra-U100: a salt of a long-chain polyaminoamide and an acid polymer, made by BYK Japan KK The results of Table 1 reveal that Examples 1 to 6 according to the present invention satisfied both storage stability and ink repellency against nozzle plates, because the inks contained a salt of a long-chain polyaminoamide and a polar acidic ester in an amount of 1% by weight or more relative to the total amount of the ink. It is also understood from the results of Examples 1 to 4 that the more the addition amount of the salt of a long-chain polyaminoamide and a polar acidic ester is, the more the ink repellency against nozzle plates is improved, and that the preferable addition amount thereof is in a range of 2 to 20% by weight because Examples 3 and 4 showed similar ink repellency.

In contrast, Comparative Examples 1 and 2, in which the salt of a long-chain polyaminoamide and a polar acidic ester was not added or was added in a very small amount, were inferior in ink repellency against nozzle plates. Comparative Example 3 was inferior in storage stability because no pigment-dispersing agent was added. Comparative Example 4, in which a polycarboxylate of a polyaminoamide was used in place of the salt of a long-chain polyaminoamide and a polar acidic ester, was inferior in storage stability. Comparative Example 5, in which a salt of a long-chain polyaminoamide and an acidic polymer was used in place of the salt of a long-chain polyaminoamide and a polar acidic ester, was not inferior in storage stability but was inferior in ink repellency against nozzle plates.

INDUSTRIAL APPLICABILITY

The oil-based inkjet ink according to the present invention is excellent in storage stability and ink repellency against nozzle plates, and consequently can be stably ejected and prevented from staining images. Thus, the present oil-based inkjet ink is useful in the field of inkjet printing.

BRIEF DESCRIPTION OF THE DRAWING

FIG. 1 is an elevation view in section, showing a method of evaluating wettability to a nozzle plate in the Examples.

In the drawings, the numeral 1 denotes inkjet ink, 2 denotes a container, 3 denotes a nozzle plate, and 4 denotes tweezers.

The invention claimed is:

1. An oil-based inkjet ink which comprises at least a pigment, a pigment-dispersing agent and a solvent, in which said solvent comprises at least an ester solvent, said inkjet ink further comprising a salt of a long-chain polyaminoamide and a polar acidic ester in an amount of 1% by weight or more relative to the total amount of the ink, in which said pigment-dispersing agent is a polyamide-based dispersing agent that has a pectinated structure constituted by a plurality of side chains composed of polyesters, and wherein said oil-based inkjet ink has an improved and lowered wettability to the surface of nozzle plates when said ink is used.

2. An oil-based inkjet ink according to claim 1, which comprises the salt of a long-chain polyaminoamide and a polar acidic ester in an amount of 2 to 20% by weight relative to the total amount of the ink.

3. An oil-based inkjet ink according to claim 1, in which said solvent comprises 30 to 70% by weight of a non-polar solvent and 70 to 30% by weight of a polar solvent, in which an ester solvent having an α-value of 6° to 8° constitutes 20% by weight or more of the total amount of the solvent.

4. An oil-based inkjet ink according to claim 3, in which an ester solvent having an α-value of 7° to 8° constitutes 20% by weight or more of the total amount of the solvent.

5. An oil-based inkjet ink according to claim 4, in which said ester solvent is at least one selected from the group consisting of isooctyl palmitate, isooctyl isopalmitate and 2-octyldodecyl pivalate.

6. An oil-based inkjet ink according to claim 3, in which said polar solvent comprises an ester solvent and an alcohol solvent.

7. An oil-based inkjet ink comprising:
at least a pigment,
a pigment-dispersing agent,
a solvent wherein said solvent comprises at least an ester solvent, and
a repellency agent comprising a salt of a long-chain polyaminoamide and a polar acidic ester in an amount of 1% by weight or more relative to the total amount of the ink,
wherein said pigment-dispersing agent is a polyamide-based dispersing agent that has a pectinated structure constituted by a plurality of side chains composed of polyesters, and said oil-based inkjet ink having an improved and reduced wettability to the surface of nozzle plates when said ink is used.

8. The oil-based inkjet ink according to claim 7, wherein said ink contains 2 to 20% by weight of said repellency agent relative to the total amount of the ink; and said solvent comprises 30 to 70% by weight of a non-polar solvent and 70 to 30% by weight of a polar solvent, in which an ester solvent having an $\alpha$-value of 6° to 8° constitutes 20% by weight or more of the total amount of the solvent.

9. A method for providing improved repellency to an oil-based inkjet ink from the surfaces of nozzle plates comprising adding a repellency agent to an oil-based inkjet ink, said repellency agent comprising a salt of a long-chain polyaminoamide and a polar acidic ester in an amount of 1% by weight or more relative to the total amount of the ink, wherein said oil-based inkjet ink composition to which said repellency agent is added comprises at least a pigment, a pigment-dispersing agent other than said repellency agent, and a solvent wherein said solvent comprises at least an ester solvent, wherein said pigment-dispersing agent is a polyamide-based dispersing agent that has a pectinated structure constituted by a plurality of side chains composed of polyesters, and wherein said oil-based inkjet ink has an improved and lowered wettability to the surface of nozzle plates when said ink is used.

* * * * *